United States Patent [19]

Jones, Sr.

[11] Patent Number: 5,083,064
[45] Date of Patent: Jan. 21, 1992

[54] LAMP MODULATING CIRCUITRY FOR INCANDESCENT AND FLUORESCENT LAMPS

[76] Inventor: Charles W. Jones, Sr., 533 W. Cypress St., Compton, Calif. 90220

[21] Appl. No.: 247,720

[22] Filed: Sep. 22, 1988

[51] Int. Cl.$^5$ .............................................. A63J 17/00
[52] U.S. Cl. .................. 315/294; 84/464 R; 315/324; 340/815.11
[58] Field of Search ............... 340/815.11; 84/464 R, 84/464 A; 315/291, 294, 323, 324

[56] References Cited

U.S. PATENT DOCUMENTS

| | | | |
|---|---|---|---|
| 3,798,638 | 3/1974 | Goldschmied | 340/815.11 |
| 3,806,873 | 4/1974 | Brady | 84/464 R |
| 3,869,699 | 3/1975 | Haller et al. | 84/464 R X |
| 4,394,656 | 7/1983 | Goettsche | 84/464 R X |
| 4,614,942 | 9/1986 | Molinaro | 340/815.11 |

Primary Examiner—Eugene R. LaRoche
Assistant Examiner—Do Yoo

[57] ABSTRACT

Apparatus for flashing incandescent and fluorescent lamps in response to audio signals such as speech or music, together or individually. Apparatus employs an automatic level control to insure uniform input level to each active filter which filters the audio information by selected components into certain preferred bands of frequencies. The outputs of these active filters are thus rectified and fed into integrators. These integrators are recycled 120 times per second by transistors across the integrating capacitor. The output of the integrators are fed into transistor comparators where individual comparators compare the input signal with a reference signal and changes state also at 120 cycles per second. The outputs of the comparators are fed into triac drivers which drive the control gates of the triacs at 60 cycles per second, thus turning the load lamps on and off at such a rate eliminates any discernabale lag in light display to audio beat sounds.

5 Claims, 5 Drawing Sheets

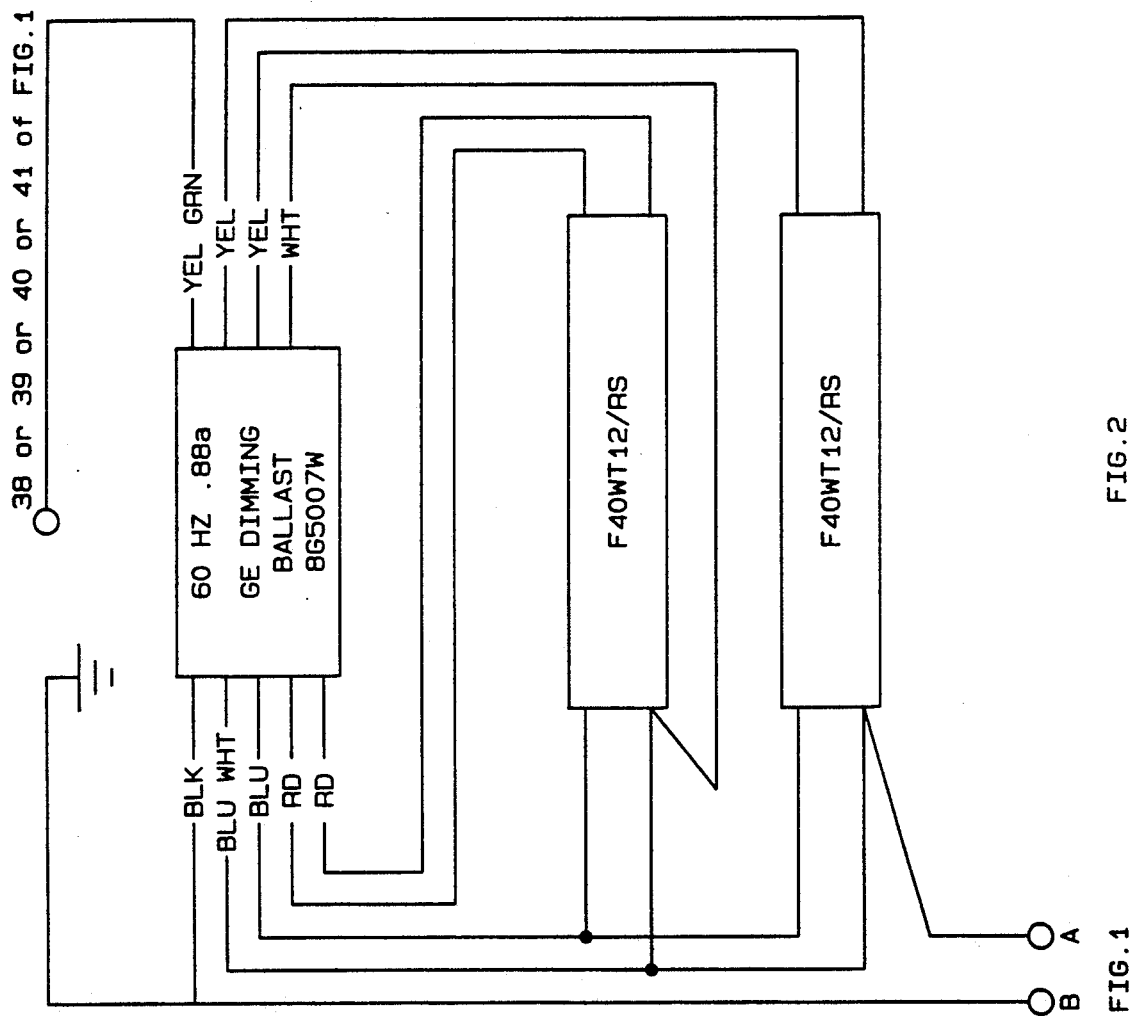

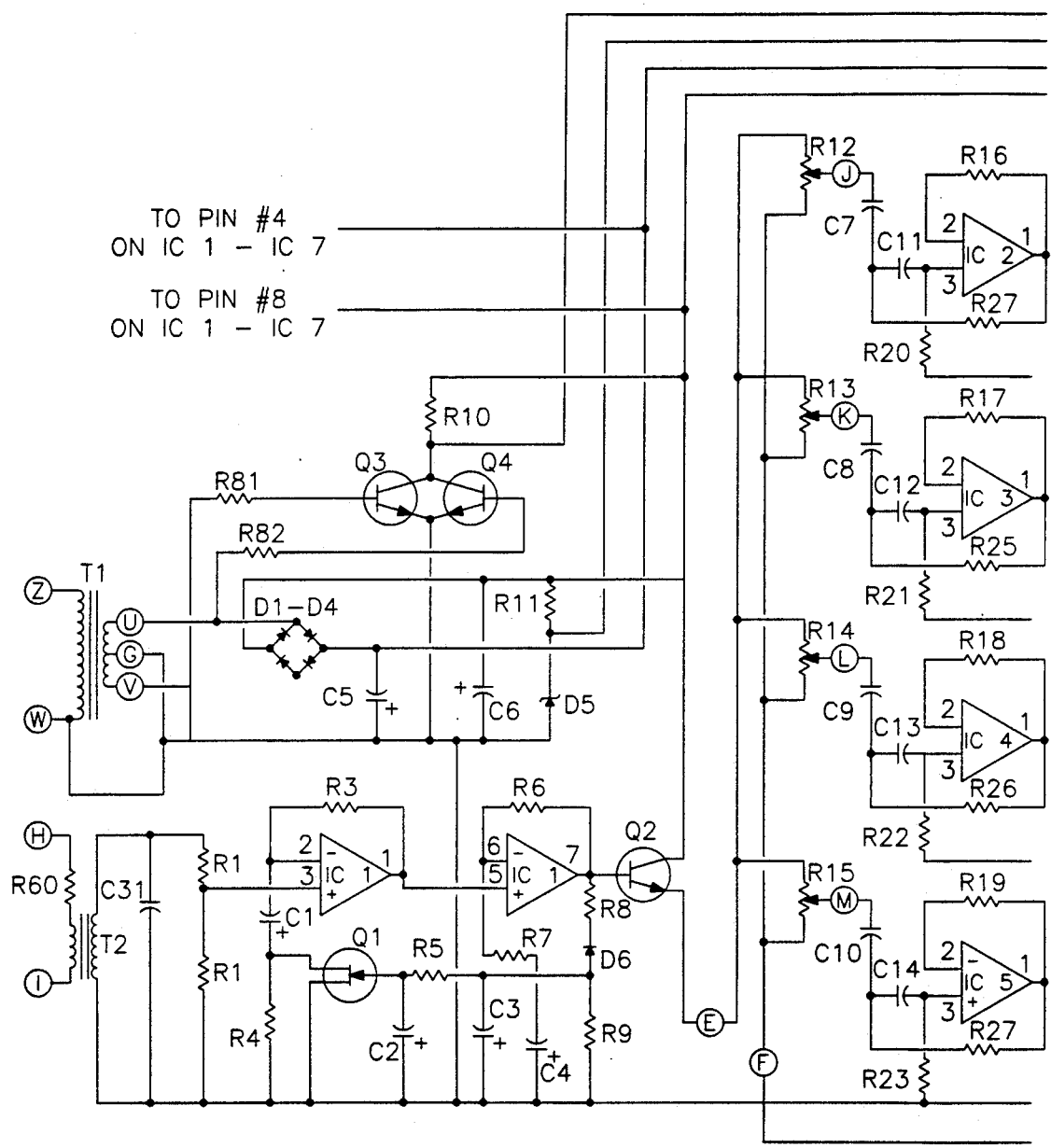
FIG. 3-A

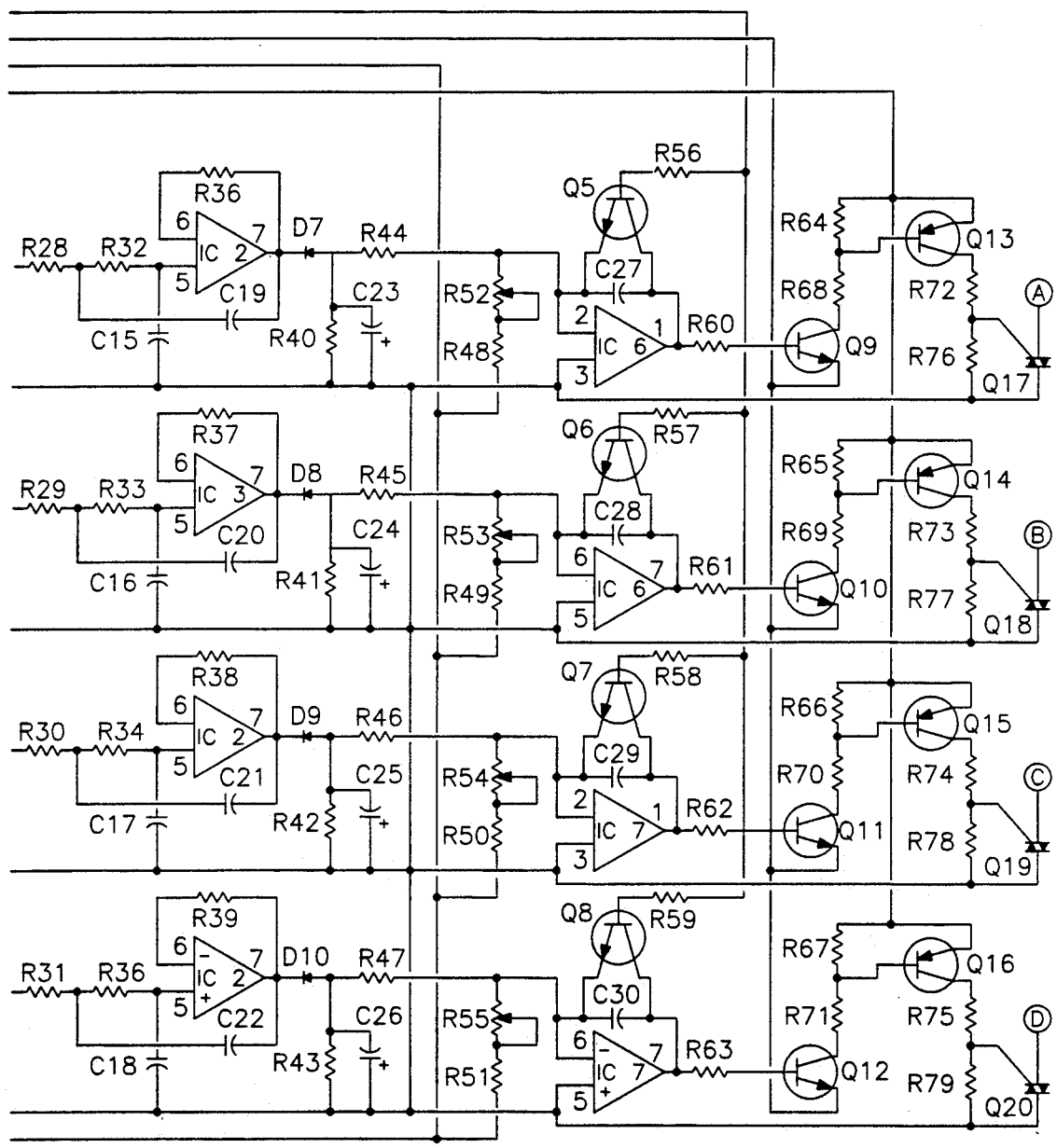
FIG. 3-B

LAMP MODULATING CIRCUITRY FOR INCANDESCENT AND FLUORESCENT LAMPS

BACKGROUND OF THE INVENTION

1. Field of the Invention

The Invention relates to a technique for flashing incandescent and fluorescent lamps, either together or independently in response to audio signals such as speech or music, to present a pleasing visual display of what one hears.

2. Description of the Prior Art

Various techniques are used for flashing different types of lamps in response to audio signals such as speech or music. Success has been obtained with incandescent lamps to a degree, but a more pleasing effect has been reached with the addition of fluorescent, taking into account the size of the apparatus used to flash the lamps. A prior problem has been a lag in light response to different instruments played. The object of the Invention is to provide a constant level of light output with low levels of audio volume input. To provide fast light response to different instruments played. The Invention will provide relatively inexpensive components.

Summary of the Invention

The disadvantages of the prior art are overcome and the objects of the Invention are carried out by circuitry which employs an automatic level control to provide a uniform level of lamp operation with low levels of audio input volume. By employing active filters to pass a certain range of frequencies and screen out the rest. The active filters comprise resistors and capacitors along with operational amplifiers to comprise low pass and high pass sections in series to comprise bandpass. Signals from the band pass filters are rectified and fed into integrators. The integrators employ operational amplifiers which are recycled 120 cycles per second by transistors across the integrating capacitors of each integrator. The outputs of the integrators are fed into comparators where the input signals are compared with a DC reference signal that also changes state at 120 cycles per second. The outputs of the comparators are fed into triac drivers which drive the control gates of the triacs at 60 cycles per second. The output of the triacs vary the intensity of the display lamps in accordance with the frequency content of the audio input signals. A power supply provides the ±18 volts required by the IC's and related circuitry in the Invention. And isolation transformer isolates the audio source from the hot ground of the apparatus.

BRIEF DESCRIPTION OF THE DRAWINGS

FIG. 2 is an electronic schematic representation of the Inventions circuitry to attach fluorescent lamps.

FIGS. 3A and 3B show the complete electronic schematic of the embodiment for reference.

DESCRIPTION OF THE PREFERRED EMBODIMENT

Figure 1A:
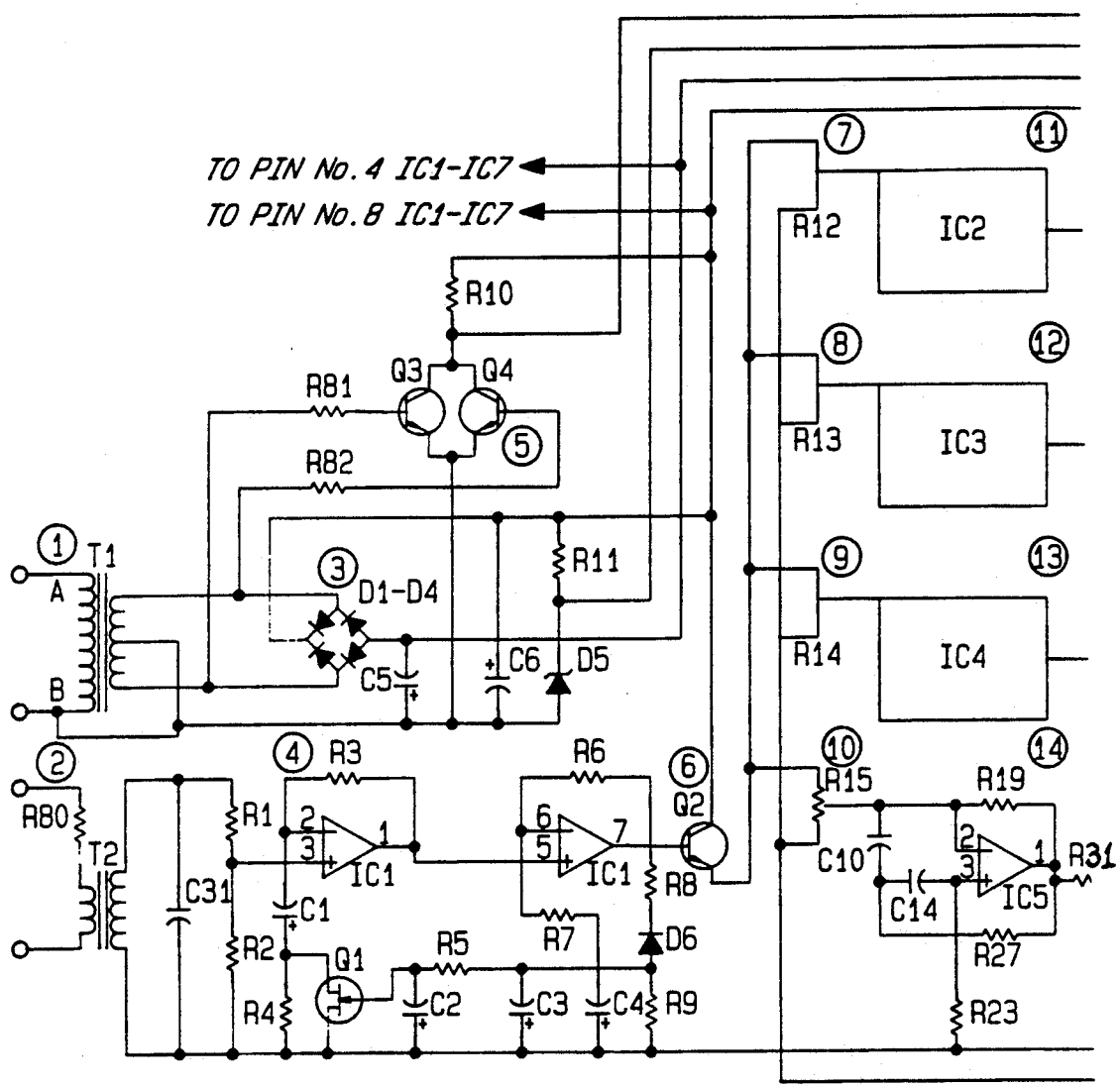
FIGS. 1A and 1B comprise a composite block diagram and electronic schematic representing the preferred embodiment of the Invention.
Figure 1B:
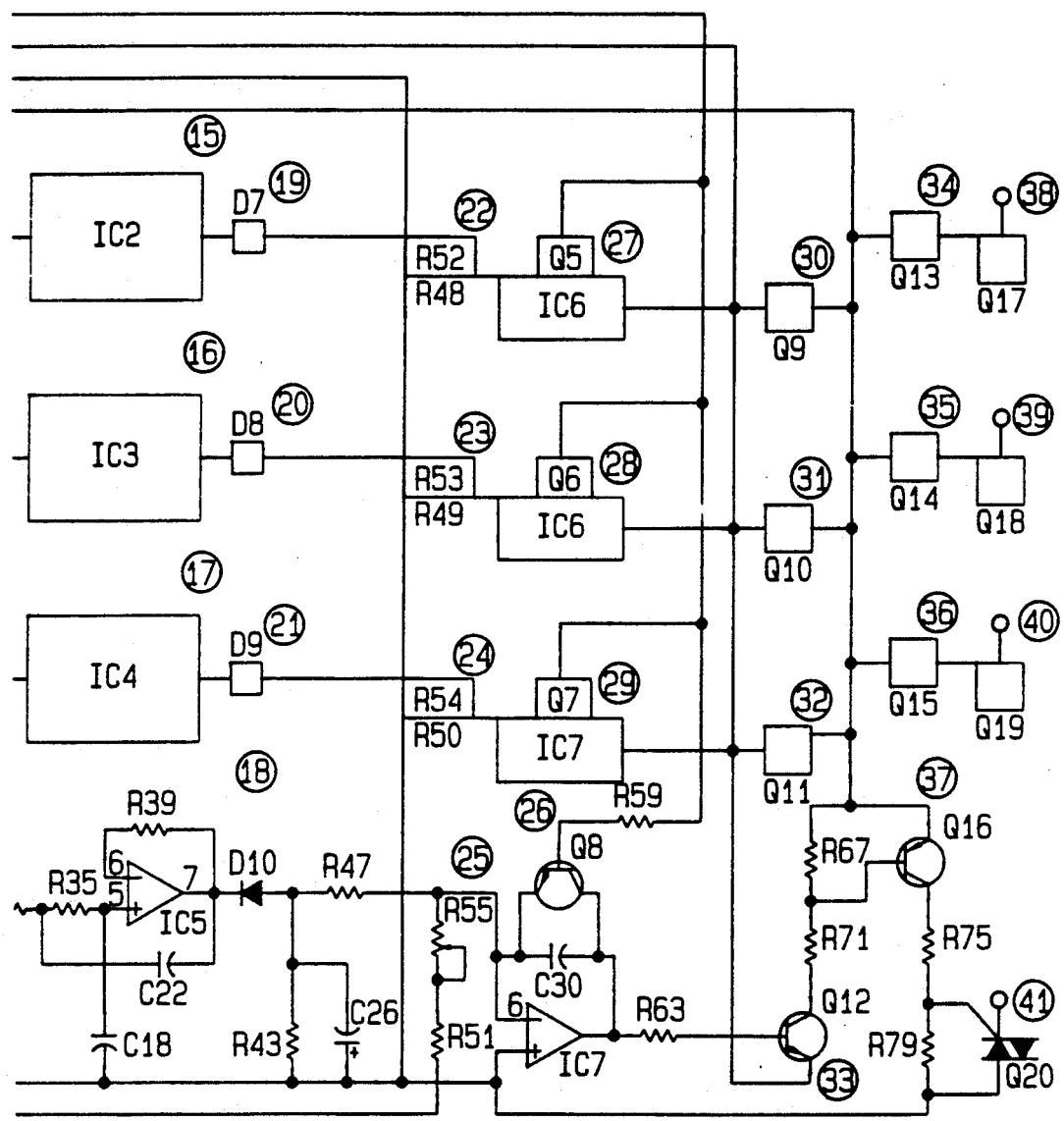

FIG. 1, illustrates a preferred embodiment of the present Invention. The block diagram portion is embodied to prevent unnecessary repetition since the four channel apparatus is exactly the same beyond the power supply and the automatic level control. The only difference from this point on, is the different value resistance and capacitance of the bandpass filters. Referring again to FIG. 1, Item #1, AC power is supplied to transformer T1, which connects ground points of the Invention to one side of the line (hot ground), and supplies power to a full bridge diode rectifier. The ±18 VDC is taken from the bridge and distributed throughout the Invention as operating voltages to the automatic level control network, the active filter network, the integrator network, the comparator network, the triac driver network and the triacs of the apparatus. Also connected to the output side of T1 is a parallel transistor network to furnish the special switching voltage to the integrator networks 26, 27, 28 and 29 as well as triac drivers 34, 35, 36 and 37. Those familiar in the art will recognize this arrangement as the basic push-pull amplifier class B.

Referring to FIG. 1, Item #2, transformer T2 is an audio transformer which serves to isolate the audio source from the hot ground of the Invention, C31 will block any DC from the source. The input to the automatic level control network Item #4 is in reality a variable reference source connected to the non-inverting input of OP-AMPIC1, Part 1 taken from R1, R2 network. Part 2 of the dual amplifier is in cascade. The voltage variations at the output is rectified by diode D6 and fed back to the inverting input of Part 1 through FET Q1 which pulses at R5, C2 time. In other words, the output automatically controls the input. The inherent characteristics of the OP-AMP will, in this arrangement, produce a constant level output with variations in input, actually this is a series type voltage regulator, the series pass transistor Q2 is necessary to handle the load currents beyond the basic output capability of the OP-AMPs. The output of Q2 is fed into load resistance pots, R12-R15. These pots are used for the sensitivity control of the Invention to select the brightness level of each individual lighting circuit for given energy level of input signal. Referring to FIG. 1, Item #10, at this point and subsequently each channel of the apparatus is identical in operation.

The difference is the value of resistance and capacitance of the bandpass filters to select the different range of frequencies passed. Thus a description of one circuit will suffice. The active filter network receives its input signals from sensitivity control R15 (a 10K linear tapier pot) into the high pass section of dual OP-AMP IC5, the low pass section is in cascade, these two sections comprise a bandpass network (also called an equal component value sallen key circuit) i.e. C10 equals C14 equals 0.01 MFD. film capacitors. R31 equals R35 equals (2.7 K$\frac{1}{4}$W) resistors. Item #11 of this section of active bandpass filters will pass the low frequencies, 60 HZ-240 Hz. Item #12 of this section of active bandpass filters will pass the medium low frequencies 240 HZ-960 HZ. The present section Item #14 will pass the high frequencies 840 HZ-15,360 HZ. The outputs of each bandpass section is rectified and applied to the background pots through diodes D7-D10. These pots set the no-signal intensity level of the lights and are adjusted so the lights are turned on just slightly, but not enough to be visible when viewing the display. R52-R55 Items #22-25 respectively are 250K OHM trimmer resistors, R48 and R51 are 100K OHM $\frac{1}{4}$W resistors. Items #26-29 comprise the integrator sections which receive their inputs from the background pots #22-25. Item #5, FIG. 1, the parallel transistor network Q3 and Q4 furnish 120 CPS voltage to the reset transistors Q5-Q8 of the low bias integrators IC6-IC7 Items #26-29.

The integrators are switched at 120 CPS. The outputs from the integrators are fed into transistor comparators Items #30-33. Item #33 receives its input from integrator, Item #26 through R63, (4.7 ½W resistor). The other inputs to the comparators are furnished from Item #3. Zener Diode D5 furnishes the reference voltage to Q9-Q12, Items #30-33. Transistor Q12 changes state each time the input signal through R63 changes direction, also at 120 CPS. The output of Q12 is fed to divider network R71 and R67, and then fed to transistor triac driver Q16 along with 120 CPS switching voltage from Item #5. The output of Q16 is fed to divider network R75 and R79 to triac Q20. The triac drivers drive the control gates of the triacs at 60 CPS each time the comparators switch, thus the triacs cause current to flow through the light loads. The lights will have an intensity proportionate to the magnitude of energy contained in the bandwidth filters Items #11-14 supplying the signals to the respective comparators Q9-Q12 and integrators Q5-Q8. Thus has been described an apparatus that will display the spectrum of an audio signal and switch the triacs at 60 CPS thus eliminating discerning lag in light display to audio beat sounds.

Referring to FIG. 2, 117 volts is applied to the GE dimming ballast 8G5007W, the ballast provides 3.5-4.5 volts to the filaments of the fluorescent tubes at all times, which allows rapid start if using rapid start tubes such as F40WT12RS. When the triacs of the apparatus FIG. 1, Items #38-41 fire, they will fire into a typical LCR circuit that delivers a pulse of 600 volts to the fluorescent tubes, the width of this pulse is around 120 microsecond and will start the lamps, the voltage then drops to 200 volts or less depending on the conduction angle of the triacs at the time.

The following is a component parts list of the disclosed embodiment.

Parts List   Color Organ

Resistors

| | |
|---|---|
| R1 10K ohm ½ watt 10% resistor | R42 10K ohm ½ watt 10% resistor |
| R2 47 ohm ½ watt 10% resistor | R43 " |
| R3 470K ohm ½ watt 10% resistor | R44 " |
| R5 100K ohm ½ watt 10% resistor | R45 " |
| R6 " | R46 " |
| R7 10K ohm ½ watt 10% resistor | R47 " |
| R8 1K ohm ½ watt 10% resistor | R48 100K ohm ½ watt 10% resistor |
| R9 10K ohm ½ watt 10% resistor | R49 " |
| R10 4.7K ohm ½ watt 10% resistor | R50 " |
| R11 680 ohm ½ watt 10% resistor | R51 " |
| *R12 10K ohm linear taper potentiometer | *R52 250K ohm trimmer resistor (x201R254B) |
| *R13 10K ohm linear taper potentiometer | *R53 250K ohm trimmer resistor (x201R254B) |
| *R14 10K ohm linear taper potentiometer | *R54 250K ohm trimmer resistor (x201R254B) |
| *R15 10K ohm linear taper potentiometer | *R55 250K ohm trimmer resistor (x201R254B) |
| R16 15K ohm ½ watt 10% resistor | R56 1K ½ watt 10% resistor |
| R17 22K ohm ½ watt 10% resistor | R57 " |
| R18 4.7K ohm ½ watt 10% resistor | R58 " |
| R19 15K ½ watt 10% resistor | R59 " |
| R20 " | R60 4.7K ohm ½ watt resistor |
| R21 22K ½ watt 10% resistor | R61 " |
| R22 4.7K ½ watt 10% resistor | R62 " |
| R23 15K ohm ½ watt 10% resistor | R63 " |
| R24 1.5K ohm ½ watt 10% resistor | R64 10K ohm ½ watt 10% resistor |
| R25 2.2K ohm ½ watt 10% resistor | R65 " |
| R26 470 ohm ½ watt 10% resistor | R66 " |
| R27 1.5K ohm ½ watt 10% resistor | R67 " |
| R28 39K ohm ½ watt 10% resistor | R68 2.2K ohm ½ watt 10% resistor |
| R29 10K ohm ½ watt 10% resistor | |
| R30 2.2K ohm ½ watt 10% resistor | R69 2.2K ohm ½ watt 10% resistor |
| R31 2.7K ohm ½ watt 10% resistor | R70 " |
| R32 39K ohm ½ watt 10% resistor | R71 " |
| R33 10K ohm ½ watt 10% resistor | R72 330 ohm ½ watt 10% resistor |
| R34 2.2K ohm ½ watt 10% resistor | R73 " |
| R35 2.7K ohm ½ watt 10% resistor | R74 " |
| R36 82K ohm ½ watt 10% resistor | R75 " |
| R37 22K ohm ½ watt 10% resistor | R76 1K ohm ½ watt 10% resistor |
| R38 4.7K ohm ½ watt 10% resistor | R77 " |
| R39 " | R78 " |
| R40 10K ohm ½ watt 10% resistor | R79 " |
| R41 " | R80 47 ohm 2 watt 10% resistor |
| | R81 22K ½ watt 10% resistor |
| | R82 " |

Capacitors

| | |
|---|---|
| *C1 10 mfd electrolytic capacitor radial lead | C16 .01 mfd film capacitor radial lead |
| *C2 100 mfd electrolytic capacitor radial lead | C17 .01 mfd film capacitor radial lead |
| *C3 1 mfd electrolytic capacitor radial lead | C18 1000 pfd poly capacitors axial lead |
| *C4 1 mfd electrolytic capacitor radial lead | C19 .1 mfd film capacitor radial lead |
| *C5 470 mfd or 500 mfd electro- | C20 .1 mfd film capacitor |

-continued

| Parts List Color Organ | |
|---|---|
| lytic capacitor radial lead | radial lead |
| *C6 470 mfd or 500 mfd electrolytic capacitor radial lead | C21 .1 mfd film capacitor radial lead |
| C7 .47 mfd film capacitor radial lead | C22 .01 mfd film capacitor radial lead |
| C8 .1 mfd film capacitor radial lead | *C23 1 mfd electrolytic capacitor radial lead |
| C9 .1 mfd film capacitor radial lead | *C24 1 mfd electrolytic capacitor radial lead |
| C10 .01 mfd film capacitor radial lead | *C25 1 mfd electrolytic capacitor radial lead |
| C11 .47 mfd film capacitor radial lead | *C26 1 mfd electrolytic capacitor radial lead |
| C12 .1 mfd film capacitor radial lead | C27 .1 mfd film capacitor radial lead |
| C13 .1 mfd film capacitor radial lead | C28 .1 mfd film capacitor radial lead |
| C14 .01 mfd film capacitor radial lead | C29 .1 mfd film capacitor radial lead |
| C15 .01 mfd film capacitor radial lead | C30 .1 mfd film capacitor radial lead |
|  | C31 .01 mfd film capacitor radial lead |
|  | C32 .47 mfd film capacitor axial lead |
| Semiconductors | |
| *D1 1N4003 diode | *D6 1N4148 diode |
| *D2 " | *D7 " |
| *D3 " | *D8 " |
| *D4 " | *D9 " |
| *D5 1N5230 zener diode | *D10 1N4148 diode |
| *IC1 4558 integrated circuit | *IC5 4558 integrated circuit |
| *IC2 " | *IC6 " |
| *IC3 " | *IC7 " |
| *IC4 " | |
| *Q1 TIS58 FET | *Q11 2N5129 transistor |
| *Q2 2N5210 transistor | *Q12 " |
| *Q3 2N5129 transistor | *Q13 2N5139 transistor |
| *Q4 " | *Q14 " |
| *Q5 " | *Q15 " |
| *Q6 " | *Q16 " |
| *Q7 " | *Q17 T2800 or 40668 triac |
| *Q8 " | *Q18 " |
| *Q9 " | *Q19 " |
| *Q10 " | *Q20 " |
| Miscellaneous | |
| *T1 24 V CT power transformer | *T2 Z3401A audio transformer |
| *S1 slide switch | F1 fuse |

I claim:

1. Apparatus for generating lighting effects in response to low level audio signals, comprising:
   an automatic level control circuit responsive to said low level audio signals for providing a controlled level audio signal; a plurality of active bandpass filters having different bandpass characteristics connected to receive the controlled level audio signal;
   a rectifier connected to the output of each filter; an integrator connected to the output of each rectifier;
   a comparator connected to the output of each integrator; means responsive to the output of each comparator for controlling current flow from an A.C. power source through a lamp; and, means for resetting each integrator, in synchronization with the A.C. power source, said resetting means including a parallel transistor network.

2. The apparatus of claim 1, wherein the active bandpass filters each include a high pass section and low pass section connected in cascade.

3. The apparatus of claim 1 wherein the integrator comprises an operational amplifier and a capacitor, and a transistor is connected across the capacitor with its base connected to the output of the resetting means.

4. The apparatus of claim 1, wherein the means for controlling current flow includes a triac controlled by a transistor driver.

5. The apparatus of claim 1 further including a transistor connected between the automatic level control circuit and the plurality of active filters.

* * * * *